Dec. 27, 1949     A. P. WARNER     2,492,205
MAGNETIC FRICTION CLUTCH
Filed March 10, 1948
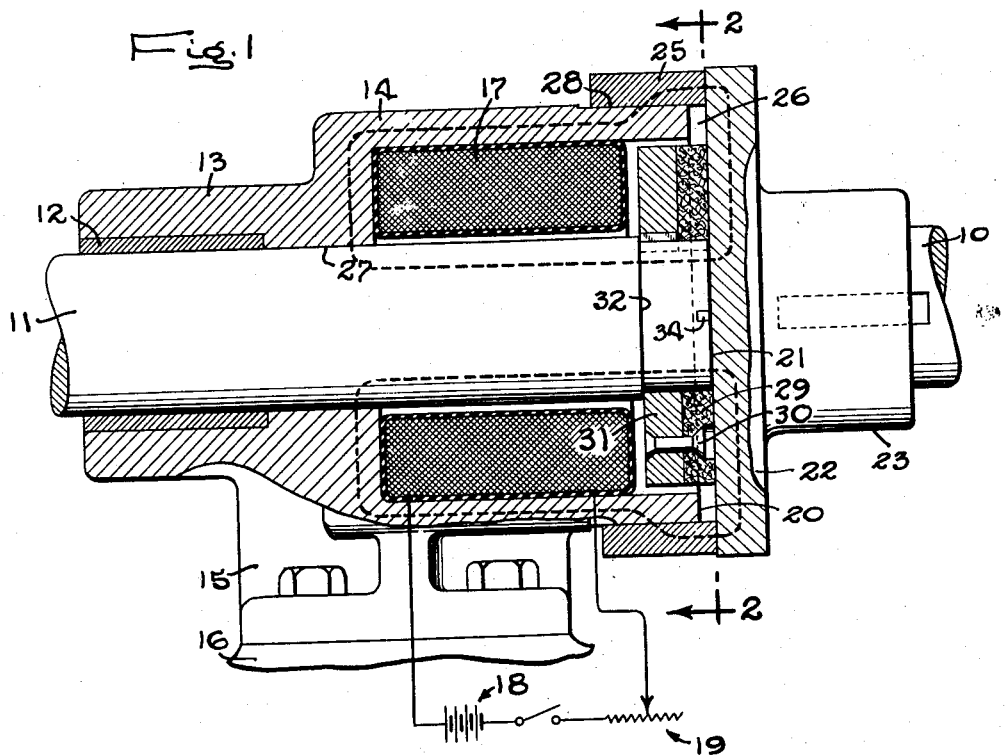
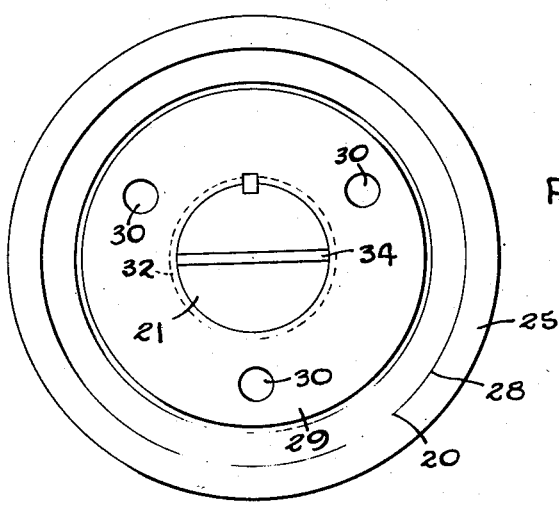
INVENTOR
Arthur P. Warner
By Carlson, Pitzner, Hubbard & Wolfe
ATTORNEY Patented Dec. 27, 1949

2,492,205

UNITED STATES PATENT OFFICE 2,492,205

MAGNETIC FRICTION CLUTCH

Arthur P. Warner, Beloit, Wis.

Application March 10, 1948, Serial No. 14,085

6 Claims. (Cl. 192—84)

This invention relates to electromagnetic friction clutches of the type in which the magnetic coil is mounted stationarily so as to avoid the necessity of providing slip rings in the current conductors leading to the coil.

The present invention aims to arrange rotating and nonrotating magnetic parts in a novel manner so as to minimize the increase in the reluctance of the magnetic flux circuit incident to mounting the magnet stationarily.

A more detailed object is to provide a novel construction of the rotatable and nonrotatable magnetic parts having coacting annular surfaces through which the flux circuit extends.

Still another object is to extend the magnetic flux circuit through an axially floating magnetic ring which is axially engageable with the magnet armature and is supported by the outer pole of the magnet proper with which the ring has a running fit.

Other objects and advantages of the invention will become apparent from the following detailed description taken in connection with the accompanying drawings, in which Figure 1 is a diagrammatically cross sectional view of a magnetic clutch embodying the present invention.

Fig. 2 is a section taken along the line 2—2 of Fig. 1.

The improved clutch is adapted to transmit rotary power between a shaft 10 supported in a suitable bearing (not shown) and a shaft 11 composed of magnetic material such as iron or steel and axially alined with the first shaft. Herein, the shaft 11 is journaled in a bearing 12 in the hub 13 of a cylindrical shell or ring 14 which cooperates with the shaft to form the magnet proper of the clutch. A lateral projection 15 formed on and projecting from one side of the shell 14 is bolted or otherwise secured to a suitable support 16.

The shell 14 is somewhat larger in diameter than the shaft 11 and receives and supports a magnetic coil 17 which surrounds and lies out of rubbing contact with the shaft 11. Being stationarily mounted in the shell 14, the coil 17 may be energized directly from a suitable source of current such as a battery 18 and, if desired, the degree of such energization may be varied by adjustment of a rheostat 19. The shell 14 projects axially beyond the coil 17 and forms the outer pole of the magnet having a face 20 which stops short of the end 21 of the shaft 11. The latter shaft end constitutes the inner pole of the magnet.

Spanning the poles 20 and 21 is an armature 22 rotatable with the shaft 10 and in this instance, formed by a disk of magnetic material having a hub 23 keyed to the shaft 10. The face of the disk 22 is flat and lies against the pole face 21.

In accordance with the present invention, provision is made for minimizing the reluctance in the magnetic flux circuit between the stationary outer pole 20 and the rotating armature 22. For this purpose, a magnetic member 25 is mounted on the stationary ring 14 for axial floating movement and for rotation relative to the ring 14, the member projecting beyond the outer pole face 20 into gripping engagement with the face of the armature 22 adjacent the outer peripheral edge thereof. Herein, the member 25 comprises a ring of magnetic material of substantial length, machined internally to have a free running fit with the machined external surface of the ring 14. With the ring 25 in axial abutment with the armature 22 as shown, a low reluctance flux path is formed around or by-passing the gap 26 between the outer pole end 20 and the armature thereby minimizing the over-all reluctance of the magnetic flux circuit. As indicated by the dotted lines, this circuit extends axially along the shaft 11, outwardly through the joint 27 between the shaft and the stationary magnet 13, axially along the ring 14, outwardly through the running joint 28, axially along the floating ring 25 and into the armature, radially through the latter, and finally axially back to the shaft 11 through the pole face 21.

To increase the effective diameter of the gripping clutch surfaces and impart greater wear resistance thereto, the radial space between the inner and outer magnet poles is substantially filled with nonmagnetic and preferably nonmetallic friction material in the form of a flat ring 29 secured as by rivets 30 to a backing disk 31. The latter is composed of nonmagnetic metal such as brass and is keyed to the end of the shaft 11 in abutment with a shoulder 32 which locates the outer axial face of the friction ring substantially flush with the inner pole face 21. In view of the relatively small diameter of the inner pole face, it will se seen that substantially the entire burden of resisting frictional wear is sustained by the ring 29 which may be made of materials best suited for this purpose.

In service use, the shafts 10 and 11 and the shell 13 are mounted so as to locate the armature 22 in close proximity with respect to the pole face 21. If desired, a light spring (not shown) may be provided to insure the maintenance of this relation as wearing off of the clutch surfaces progresses. When the coil 17 is energized, magnetic flux will thread the low reluctance paths shown resulting in axial attraction between the armature and the inner pole 21 thereby causing gripping engagement between the armature face and both the pole face 21 and the friction face 29. Rotary power is thus transmitted between the rotary shafts 10 and 11.

If the magnetic pole 21 is composed of solid magnetic material such as steel harder than the friction material 29, it tends to wear off in an axial direction more slowly than the friction material owing to the difference in diameters of these two surfaces. Such differential wearing would tend to concentrate the attractive force of the magnet on the inner pole face 21 and thereby reduce the effective diameter of the gripping surfaces of the clutch. One way of preventing this is to undercut the armature 22 opposite the pole face 21 automatically as the ring 29 wears off. This may be accomplished, for example, by setting in the face of the pole 21 a bar 34 of hardened steel or other material harder than the armature face. This bar is flush with the pole face and extends across the full diameter of the latter so as to wear away the central part of the armature as the ring 29 wears off. In this way the axial force resulting from attraction of the magnet is always distributed evenly over the surfaces of the ring 29 and the pole 21 so that the effective diameter of the clutching surfaces remains constant.

I claim as my invention:

1. A magnetic clutch comprising a rotary shaft composed of magnetic material and providing an axially facing inner magnetic pole face at its end, an annular magnetic coil encircling the end portion of said shaft adjacent said pole face, a nonrotatable member supporting said coil and providing a journal for said shaft on the side of said coil opposite the pole face, said member having an annular end portion surrounding said coil and projecting axially short of said inner pole face to provide an outer magnet pole, an armature larger than said outer pole rotatable about the axis of said shaft and adapted for axial gripping engagement with said inner pole face, and a ring of magnetic material supported by and loose on the end portion of said member and projecting beyond the end of said outer pole into axial engagement with said armature.

2. A magnetic clutch comprising a nonrotatable cylindrical shell of magnetic material open at one end and providing a bearing at the other end, an armature disk of magnetic material rotatable about the axis of said shell and disposed at the open end thereof, a shaft of magnetic material journaled in said bearing and projecting through said shell into end abutment with said armature disk, an annular magnetic coil secured in said shell and surrounding said shaft, a non-magnetic ring fast on said shaft within said shell and providing a wear surface engageable with said disk during engagement of the latter with the end of said shaft, and a ring of magnetic material encircling the open end of said shell and projecting beyond the latter for axial gripping engagement with the outer peripheral portion of said disk, said ring having a running fit with and slidable axially on the shell.

3. A magnetic clutch comprising a shaft of magnetic material, an annular magnetic coil encircling said shaft, a ring of magnetic material concentric with said shaft, means on said shaft supporting said ring and said coil, a rotary armature adapted for simultaneous axial engagement with the ends of said shaft and said ring, and a ring of non-magnetic material adapted for axial gripping engagement with said armature between said first ring and the shaft and mounted on the latter for rotation therewith.

4. A magnetic clutch comprising a shaft of magnetic material providing an inner pole face, an annular magnetic coil encircling said shaft, a rotary armature adapted for axial gripping engagement with said pole face, a nonrotatable support of magnetic material supporting said coil and providing an axially facing outer magnetic pole axially spaced from said armature, and an annular member rotatable on said support and projecting axially therefrom into axial engagement with the outer peripheral portion of said armature.

5. A magnetic clutch comprising a shaft of magnetic material, an annular magnetic coil encircling said shaft, a ring of magnetic material concentric with said shaft, a rotary armature adapted for simultaneous axial engagement with the ends of said shaft and said ring, and a nonrotatable member of magnetic material supporting said coil and having a running fit with said shaft and said ring.

6. A magnetic clutch comprising a shaft of magnetic material providing an inner pole face, an annular magnetic coil encircling said shaft, a ring of magnetic material concentric with said shaft and providing an outer magnetic pole, a rotary armature adapted for axial simultaneous engagement with the ends of said shaft and said ring, a ring of non-magnetic wear material adapted for axial engagement with said armature between said first ring and the shaft and mounted rigidly on the latter for rotation therewith and for gripping engagement with said armature, and means operable automatically as an incident to wearing off of one of the gripping surfaces to remove material from another of the surfaces and maintain uniform distribution of the magnetic attraction over the engaging surfaces of said armature on the one hand and said non-magnetic ring and said inner pole face on the other hand.

ARTHUR P. WARNER.

REFERENCES CITED

The following references are of record in the file of this patent:

UNITED STATES PATENTS

| Number | Name | Date |
| --- | --- | --- |
| 2,039,714 | Fuller | May 5, 1936 |